United States Patent
Martiška et al.

(10) Patent No.: US 11,738,819 B2
(45) Date of Patent: Aug. 29, 2023

(54) ILLUMINATION DEVICE FOR MOTORCYCLE HEADLAMP

(71) Applicant: ZKW Group GmbH, Wieselburg (AT)

(72) Inventors: Matej Martiška, Lovce (SK); Anton Kokoška, Zázrivá (SK)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 17/994,613

(22) Filed: Nov. 28, 2022

(65) Prior Publication Data
US 2023/0174183 A1    Jun. 8, 2023

(30) Foreign Application Priority Data
Dec. 2, 2021 (EP) ..................... 21211988

(51) Int. Cl.
*B62J 6/023* (2020.01)
*F21S 41/24* (2018.01)

(52) U.S. Cl.
CPC ............... *B62J 6/023* (2020.02); *F21S 41/24* (2018.01)

(58) Field of Classification Search
CPC ...... F21S 41/143; F21S 41/153; F21S 41/151; F21S 41/24; B62J 6/023
See application file for complete search history.

(56) References Cited

U.S. PATENT DOCUMENTS

| | | | |
|---|---|---|---|
| 10,690,307 B2 * | 6/2020 | Gromfeld | ............ G02B 6/0001 |
| 10,724,699 B2 * | 7/2020 | Zhang | ............ F21V 5/007 |
| 2014/0198513 A1 | 7/2014 | Stefanov et al. | |
| 2015/0167913 A1 * | 6/2015 | Stefanov | ............ F21S 41/663 362/511 |
| 2021/0048161 A1 | 2/2021 | Taudt et al. | |

FOREIGN PATENT DOCUMENTS

| | | |
|---|---|---|
| DE | 102013211878 A1 | 12/2014 |
| DE | 102018209061 A1 | 12/2019 |
| EP | 3339720 A1 | 6/2018 |

OTHER PUBLICATIONS

Search Report for European Patent Application No. 21211988.7, dated May 19, 2022 (7 pages).

* cited by examiner

*Primary Examiner* — Matthew J. Peerce
(74) *Attorney, Agent, or Firm* — Eversheds Sutherland (US) LLP

(57) ABSTRACT

An illumination device for a motorcycle headlamp, which device is configured to create a segmented light pattern and includes: (i) a plurality of light sources, at least some of which are configured to be activated independently from each other, (ii) a segmented light guide unit, including a plurality of light guide elements and a light homogenization body, and (iii) a projection lens, which is configured to receive the light emitted from the collective light exit surface of the light homogenization body and to project the segmented light pattern, wherein at least some of the light guide elements are part of a first group of light guide elements, said first group having a defined geometric shape of the light entry surface, which is limited by four corners connected by four side edges (left, right, lower, and upper) wherein three of the side edges are straight, and the fourth edge has a rounded protrusion, which increases the light entrance surface, and is either the left or the right edge of the respective light guide element.

17 Claims, 6 Drawing Sheets

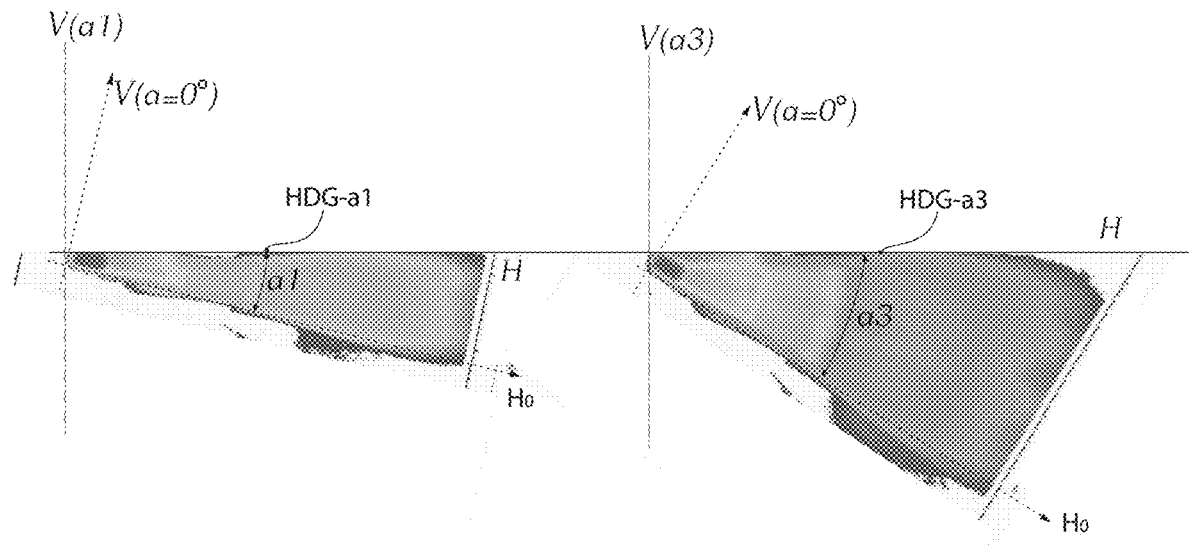
Fig. 8a
Fig. 8c
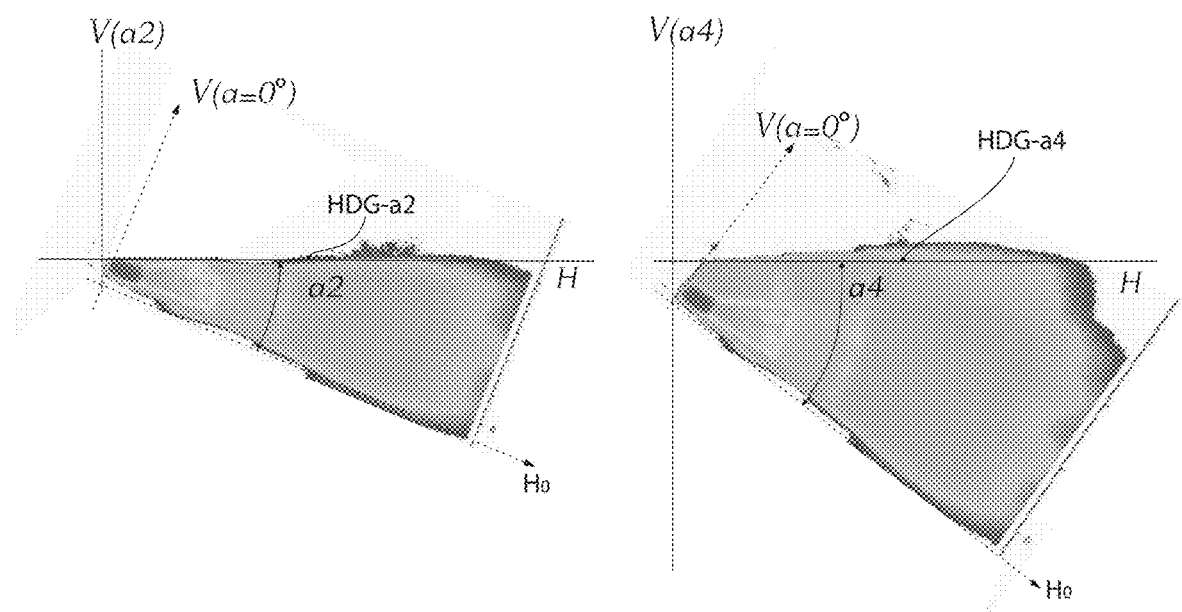
Fig. 8b
Fig. 8d

ILLUMINATION DEVICE FOR MOTORCYCLE HEADLAMP

CROSS-REFERENCE TO RELATED APPLICATIONS

This application claims priority to European Patent Application No. 21211988.7, filed Dec. 2, 2021, which is incorporated herein by reference.

FIELD OF THE INVENTION AND DESCRIPTION OF PRIOR ART

The present invention relates to an illumination device for a motorcycle headlamp, wherein the illumination device is configured to create a segmented light pattern.

Illumination devices that allow an irradiation of a segmented light pattern are known from prior art. For instance, document AT 513341 A1 discloses an illumination device for radiation of a segmented light pattern. This illumination device is designed for use in cars. Contrary to motorcycles, vehicle headlamp for cars are usually less constrained by size requirements and do not need to have any adaptions for lateral inclinations of a car. Usually, the lateral inclinations of cars are minor.

SUMMARY OF THE INVENTION

Due to limited space headlamps for motorcycles often have a lower number of segments (in particular columns) when segmenting a light pattern. Consequently, each segment covers a wider spatial angle. Having a wider spatial angle for a given segments leads to problems regarding visible differences of the light intensity in the light pattern. In detail, darker vertical gaps can be seen in areas wherein segments are adjacent to each other.

It is an object of the present invention to provide an illumination device for a motorcycle headlamp that offers a light distribution having an increased homogeneity.

This object is achieved by an illumination device of the above-mentioned kind, wherein the illumination device comprises a plurality of light sources, wherein at least some of these light sources are configured to be activated independently from each other, a segmented light guide unit, comprising a plurality of light guide elements and a light homogenization body, wherein each light guide element has a distal end comprising a light entry surface that is configured to receive light from at least one of the plurality of light sources, and wherein each light guide element fully extends towards the homogenization body, said extension following at least partially along a main beam direction of the illumination device, wherein the light guide elements are arranged in at least four columns but no more than twelve columns and least three rows in order to enable a segmentation of the light pattern, wherein the cross section of each light guide element continuously increases along its extension starting from its entry surface towards the light homogenization body, said cross section being measured in a plane that is oriented orthogonal to the main beam direction, wherein the segmented light guide unit is created as a single pieced component by way of molding, in particular injection molding of the plurality of light guide elements together with the light homogenization body, wherein the light homogenization body extends along the main beam direction in order to allow at least partial homogenization of light received from the light guide elements and wherein the light homogenization body comprises a collective light exit surface for irradiating light received by the light guide elements, and a projection lens, which is configured to receive the light emitted from the collective light exit surface of the light homogenization body and to project the segmented light pattern, wherein at least some of the light guide elements are part of a first group of light guide elements, said first group of light guide elements having a defined geometric shape of the light entry surface, said light entry surface being limited by four corners connected by four side edges, namely a left edge, a right edge, a lower edge and an upper edge, wherein three out of these four side edges are straight, and wherein the fourth edge differs from the three straight edges by having a rounded protrusion, said rounded protrusion increasing the light entrance surface, wherein said fourth edge is either the left or the right edge of the respective light guide element.

Said corners do not have to be sharp but can be also be rounded to some degree. However, straight lines connecting these corners shall remain regarding the above-mentioned three straight corners. The protrusion can also be arranged in the corner. A light guide element in the meaning of the present invention is an element that is configured to guide light along a specific path that is defined by the shape of the light guide element. A light guide element has a surface for receiving light and guides the light within the light guide element by way of reflection, in particular total reflection along the side walls, along its extension. The light guide elements can direct the light towards the homogenization body. The projection lens can project the light pattern in a frontal space, for instance a street. All the positional explanations refer to a mounted state of the illumination device from a perspective watching in line with the main beam direction.

The light guide elements and/or the light homogenization body can be made of silicone and/or optical plastics. A 2-Photon Polymerisation can be used for producing the silicone parts. There is also the possibility to use a set of lenses, called "lens system", e.g. an Achromat.

A motorcycle is typically a two-wheeled single-track motor vehicle, but generally speaking a two-wheeled or three-wheeled motor vehicle that is designed to incline/bank along its longitudinal axis when cornering. Possible bank angles of 45° are common.

Preferably, the rounded protrusion extends along between 30% and 80% of the length of the fourth edge. This length is measured based on the shortest distance between the corners of the edge. Such protrusions allow for an optimal overlap of the light of neighbouring segments to avoid visible vertical lines between these segments since their lateral outer surfaces form larger fields of views of the individual segments, due to different angle of total internal reflection.

Preferably, the protrusion increases the size of the light entrance surface between 5% and 30%. Such protrusions allow for an optimal overlap of the light of neighbouring segments to avoid visible vertical lines between these segments.

Preferably, the extent of the protrusion continuously decreases in a curved shape along the extension of the respective light guide element towards the light homogenization body. This allows for a smooth transition into the homogenization body and affects the homogenization positively. Preferably, the protrusion even ends prior to reaching the light homogenization body.

Preferably, each light guide element of the segmented light guide unit is assigned to a specific segment of the light pattern that can be irradiated by the illumination device, wherein neighbouring light guide elements are assigned to neighbouring segments.

Preferably, each row of the light guide element of the segmented light guide unit including the light sources assigned to these rows can be activated and deactivated independently of each other, wherein the illumination device is configured to be controlled based on a measured bank angle of the motorcycle, wherein the rows are tilted with regard to another and activation and deactivation of the rows is performed based on the measured bank angle of the motorcycle, in particular in order to add additional light irradiation into an area of a low beam distribution.

This allows for a maximum resolution of the illumination device while optimizing the behaviour of the illumination device when cornering, thus avoiding glaring while maintaining optimal road illumination. Due to inclination of the motorcycle some of the light segments that are devoted to the high beam light distribution in an upright position will be irradiating into the low beam segment due to the inclination into a lower position—depending on the direction and extent of the inclination. Hence, the low beam module can be supported by the high beam module by selective activation of segments, in particular rows of the illumination device.

Preferably, the illumination device is configured to enable the irradiation of a high beam light distribution. This high beam light distribution can be irradiated when the bike is in an upright position and typically rides straight ahead. When the bike is runs straight ahead, a high beam light distribution can be radiated. When the bike leans into curves for instance only one side of the one/two/three circular sector (like slices of pizza) can be activated in dependence of the bank angle. This is where the "rounded protrusion" is in particular useful: In contrast to sharp borders of a segmented highbeam light distribution, here the light segments of the singe light guide elements will smoothly overlap from the centre to periphery along a radial direction.

When cornering, a homogeneous low-beam distribution is generated and the cut-off line is aligned with the horizon at different bank angles.

Preferably, at least some of the light guide elements are part of a second group of light guide elements, said second group of light guide elements having a defined geometric shape of the light entry surface, said light entry surface being limited by four corners connected by four side edges, namely a left edge, a right edge, a lower edge and an upper edge, wherein all four side edges are straight. This allows mixing of sharply visible light segments with smoothened visible light segments. Preferably, the light entry surface of each light guide element of the second group has essentially a quadratic shape.

Preferably, the number of light guide elements of the first group amounts to at least 33% of the total number of light guide elements of the segmented light guide unit.

Preferably, the projection lens has an optical axis and a Petzval area, wherein the segmented light guide unit and the projection lens are arranged to each other in such a way that the collective light exit surface of the segmented light guide unit is positioned in the Petzval area of the projection lens. The single projection lens can also be replaced by a lens system with several lens elements of different geometry and of distinct transparent materials. Preferably, an achromatic doublet is used to reduce chromatic aberrations.

Preferably, the segmented light guide unit and the projection lens are coaxially arranged with the main beam direction of the illumination device.

Moreover, the present invention also relates to a motorcycle headlamp comprising an illumination device according to the present invention, wherein the vehicle headlamp further comprises a low beam light module for irradiating a low beam light distribution.

Preferably, the optic body is developed into a single collective projection lens, said collective projection lens being configured to project light emitted from the illumination device and the low beam light module.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION OF EMBODIMENTS OF THE INVENTION

In the following figures identical reference signs refer to identical features unless expressly depicted otherwise.

Figure 1:
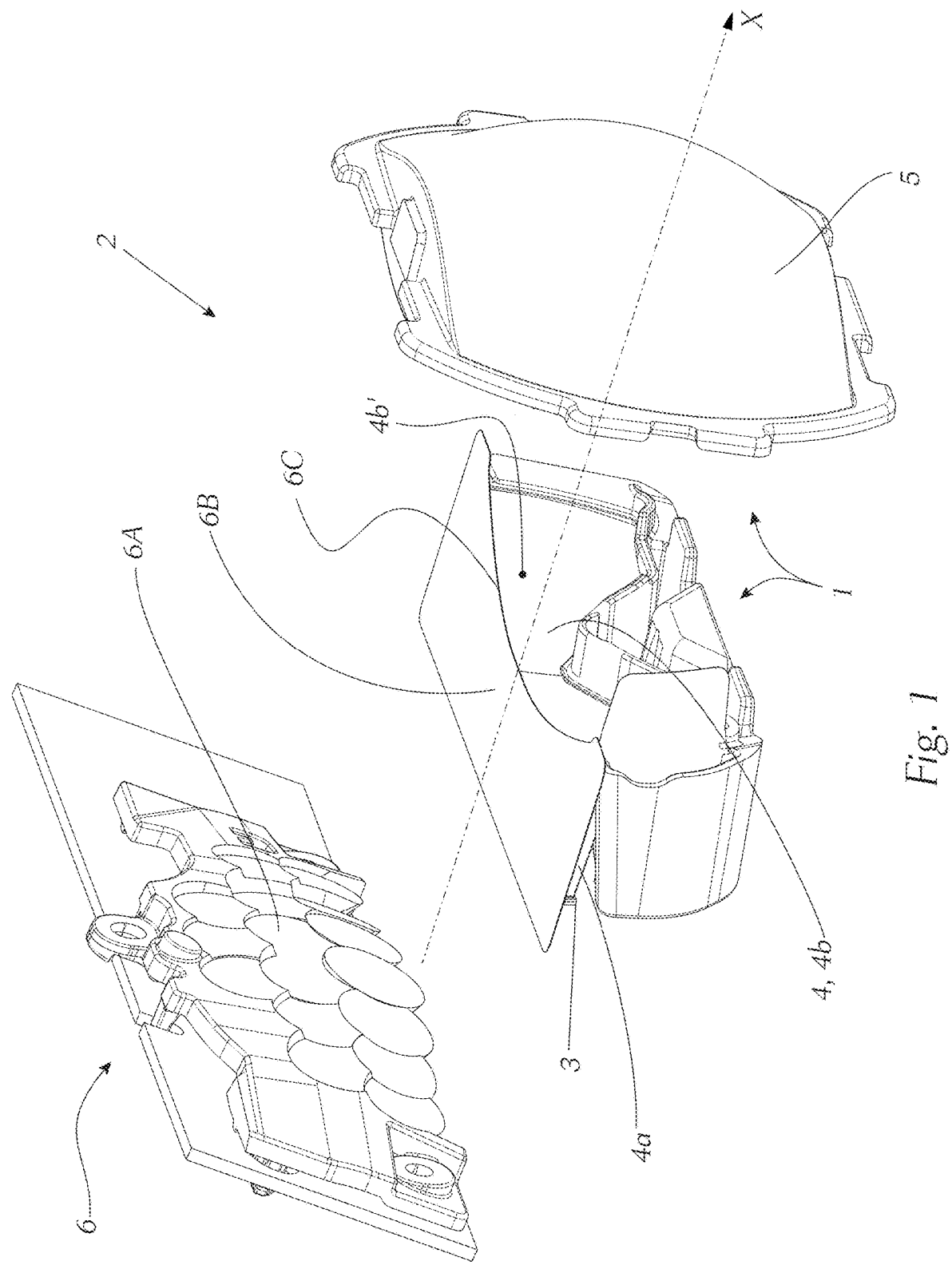
FIG. 1 a perspective view of a motorcycle headlamp according to the present invention, FIG. 2 a perspective view of a segmented light guide unit of FIG. 1, FIG. 3 a view of the back side of the light guide unit of FIG. 2, FIG. 4 a detailed view of light guide elements on the left part of the light guide unit according to FIGS. 1 to 3, FIG. 5 a comparison of light guide elements of a first group and a second group, FIG. 6a a left part of a light guide unit with light guide elements of the second group, FIG. 6b a scenario wherein the illumination device according to the present invention is tilted due to cornering, FIG. 7 exemplary light rays that travel through the segmented light guide unit according to the invention, and FIGS. 8a to 8d different light distributions on a measuring screen generated by an exemplary illumination device based on an activation of individual row segments of the light pattern at different bank angles.

FIG. 1 shows an perspective view of a motorcycle headlamp 2 according to the present invention. The motorcycle headlamp 2 comprises an illumination device 1. Of course, the headlamp 2 can typically comprise further elements like a housing, a clear view screen closing the housing, adjusting devices, screws etc. which are not shown in the figures. The illumination device 1 is configured to create a segmented light pattern and comprises: A plurality of light sources 3, wherein at least some of these light sources 3 are configured to be activated independently from each other and a segmented light guide unit 4, comprising a plurality of light guide elements 4a (see also FIG. 2 to FIG. 4) and a light homogenization body 4b. Each light guide element 4a has a distal end comprising a light entry surface 4a' (see for instance FIG. 2) that is configured to receive light L (see FIG. 7) from at least one of the plurality of light sources 3. The invention also relates to a motorcycle headlamp 2 comprising an illumination device 1 according to the present invention, wherein the vehicle headlamp 2 further comprises a low beam light module 6 for irradiating a low beam light distribution. Preferably, the optic body 5 can be developed into a single collective projection lens, said collective projection lens being configured to project light emitted from the illumination device 1 and the low beam light module 6.

Figure 2:
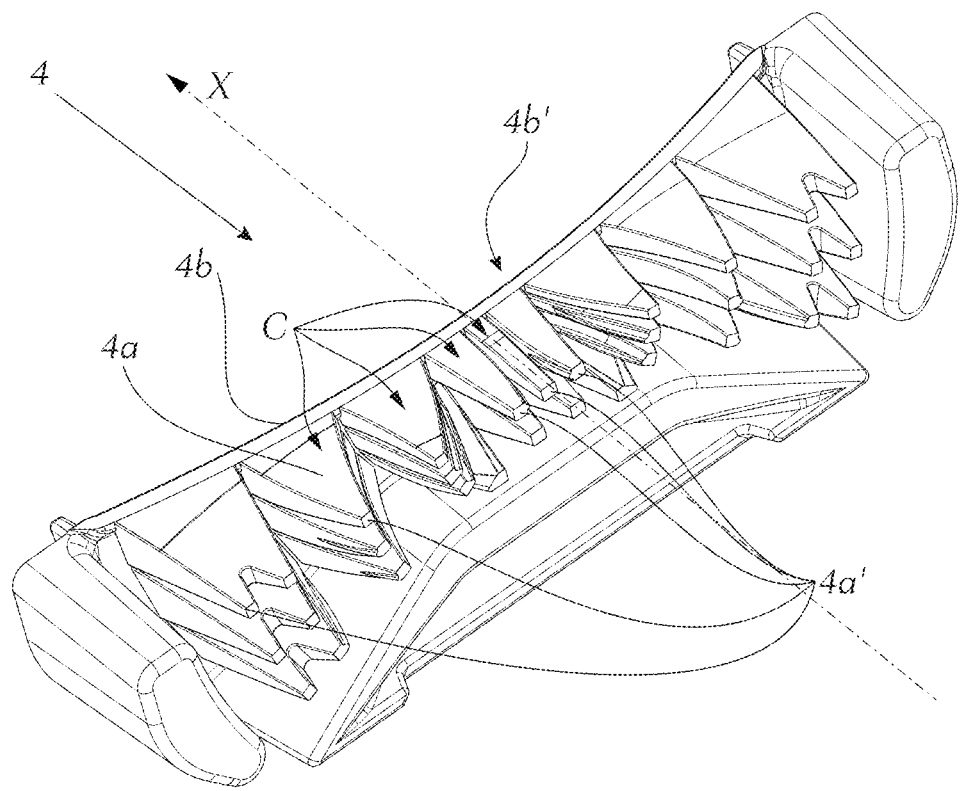

Taking a closer look at FIG. 2, it is visible that each light guide element 4a fully extends towards the homogenization body 4b, said extension following at least partially along a main beam direction x of the illumination device 1, wherein the light guide elements 4a are arranged in at least four columns C but no more than twelve columns C and at least three rows R1 to R7 in order to enable a segmentation of the light pattern. The cross section of each light guide element 4a continuously increases along its extension starting from its entry surface 4a' towards the light homogenization body 4b, said cross section being measured in a plane that is oriented orthogonal to the main beam direction x. The segmented light guide unit 4 is created as a single pieced component by way of molding, in particular injection molding of the plurality of light guide elements 4a together with the light homogenization body 4b. The light homogenization body 4b extends along the main beam direction x in order to allow at least partial homogenization of light received from the light guide elements 4a and wherein the light homogenization body 4b comprises a collective light exit surface 4b' for irradiating light L1, L2, L3, L4 received by the light guide elements 4a. The light guide elements 4a arranged in the outer left and the outer right column C of contain two light entry surfaces 4a' each. This allows to align two light sources with a wider segment of the light distribution such that a high light intensity can be achieved despite the wider spatial angle of the respective segment.

Figure 4:
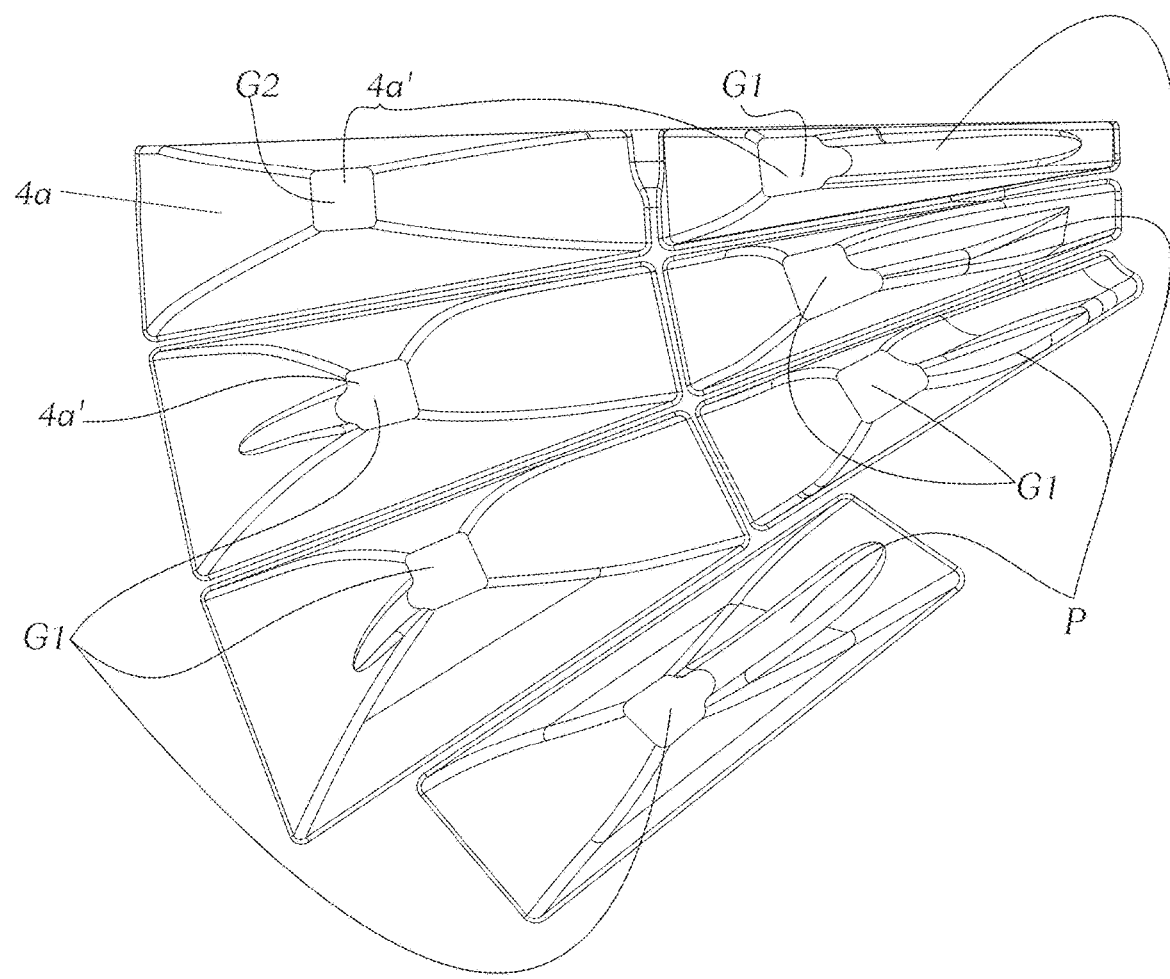
Figure 5:
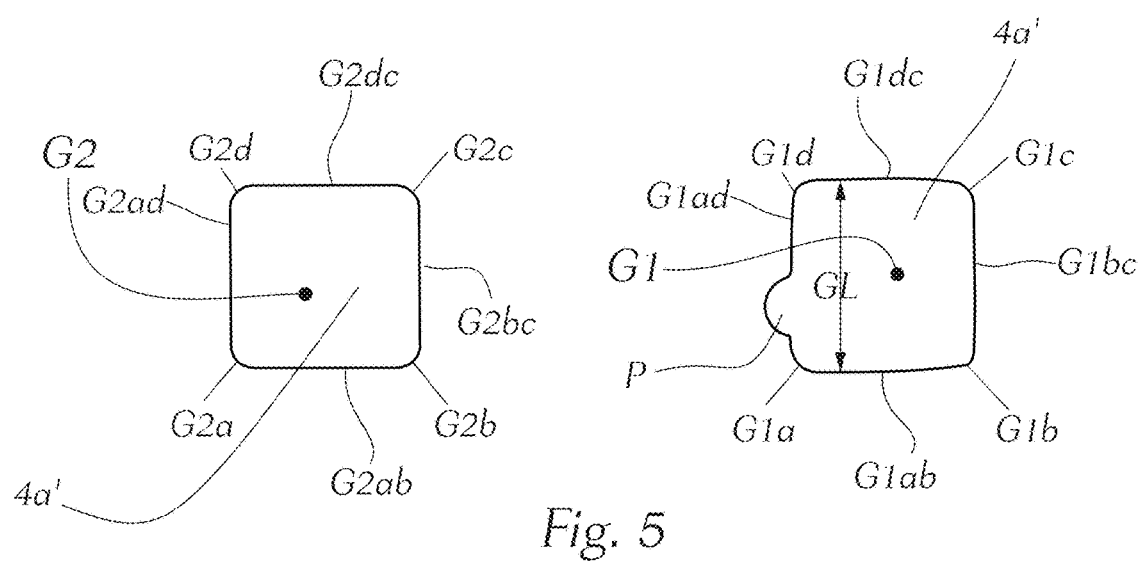

FIG. 1 shows that the illumination device 1 further comprises a low beam optics 6A, for example collimators, a low beam bezel 6B having a cut-off edge 6C and aligned almost horizontally, and a projection lens 5, which is configured to receive the light emitted from the collective light exit surface 4b' of the light homogenization body 4b and to project the segmented light pattern. Taking a closer look at FIGS. 3 to 5 it can be seen that at least some of the light guide elements 4a are part of a first group G1 of light guide elements 4a, said first group G1 of light guide elements 4a having a defined geometric shape of the light entry surface 4a'. FIG. 5 shows that said light entry surface is limited by four corners G1a, G1b, G1c, G1d connected by four side edges, namely a left edge Glad, a right edge G1bc, a lower edge G1ab and an upper edge G1dc, wherein three out of these four side edges are straight, and wherein the fourth edge differs from the three straight edges by having a rounded protrusion P, said rounded protrusion P increasing the light entrance surface 4a', wherein said fourth edge is either the left or the right edge of the respective light guide element 4a1.

Preferably, the rounded protrusion P extends along between 30% and 80% of the length GL of the fourth edge. Preferably, the protrusion P can increase the size of the light entrance surface 4a' between 5% and 30%. Moreover, the extent of the protrusion P can continuously decrease along the extension of the respective light guide element 4a towards the light homogenization body 4b (see for instance FIG. 4). Preferably, the protrusion P ends prior to reaching the light homogenization body 4b.

Figure 7:
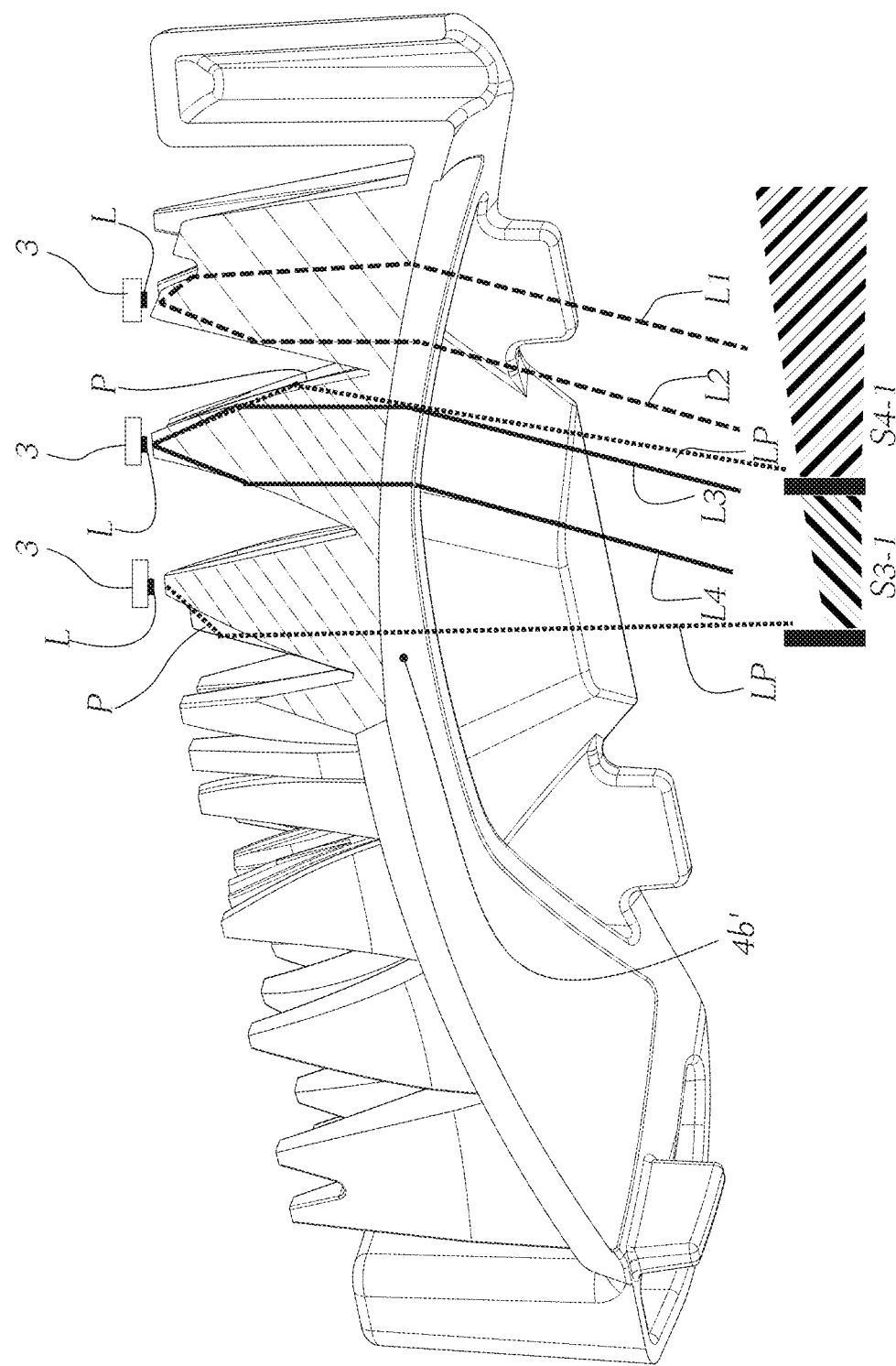

Each light guide element 4a of the segmented light guide unit 4 is assigned to a specific segment of the light pattern that can be irradiated by the illumination device 1, wherein neighbouring light guide elements 4a are assigned to neighbouring segments, see for instance the segments S3-1 and S-4-1 shown in FIG. 7. Taking a closer look at FIG. 7, it can be seen that the light L irradiated by the light sources 3 enters the light guide elements 4a, travels towards the homogenization body 4b and leaves the body 4b at its collective light exit surface 4b'. The light rays L1 and L2 are ending up (after projection by the projection lens 5 that is not shown in FIG. 7) within the segment S4-1 and the light rays L3 and L4 coming from a different light guide element 4a are entering the segment S3-1. These segments do not overlap. As a consequence, dark areas would occur between these segments if no protrusions P would allow for additional light rays LP entering these areas. Hence, the protrusions P allow to add additional light rays LP in the vertical areas between neighbouring segments which increases the homogeneity of the projected light pattern.

Preferably, each row R1 to R7 of the light guide element 4a of the segmented light guide unit 4 including the light sources 3 assigned to these rows R1 to R7 can be activated and deactivated independently of each other, wherein the illumination device 1 is configured to be controlled based on a measured bank angle of the motorcycle, wherein the rows are tilted with regard to another and activation and deactivation of the rows R1 to R7 is performed based on the measured bank angle of the motorcycle, in particular in order to add additional light irradiation into an area of a low beam distribution. Preferably, the illumination device 1 is configured to enable the irradiation of a high beam light distribution.

Figure 6A:
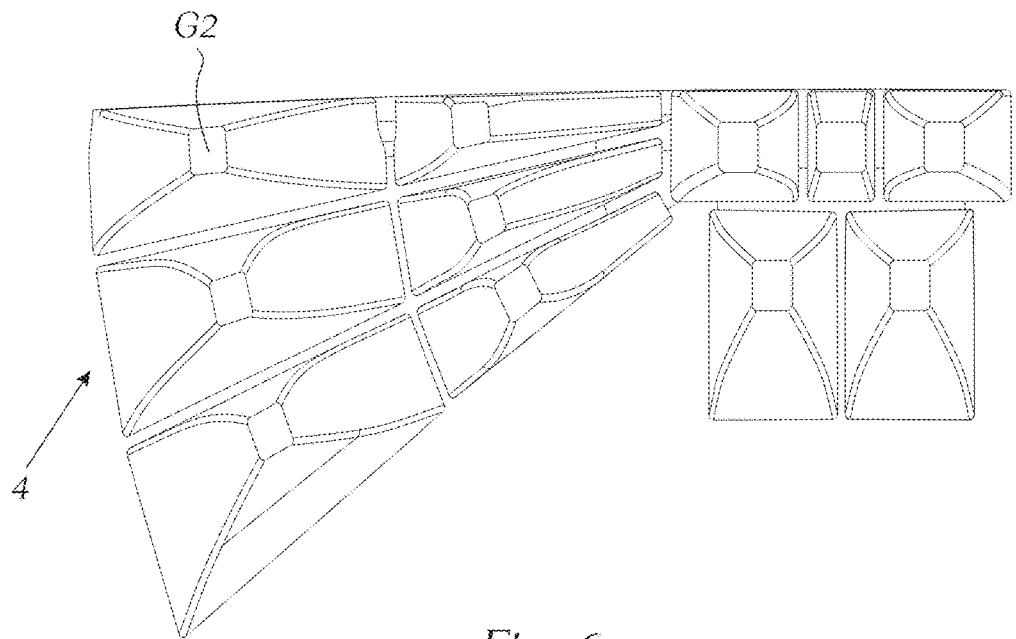
Figure 6B:
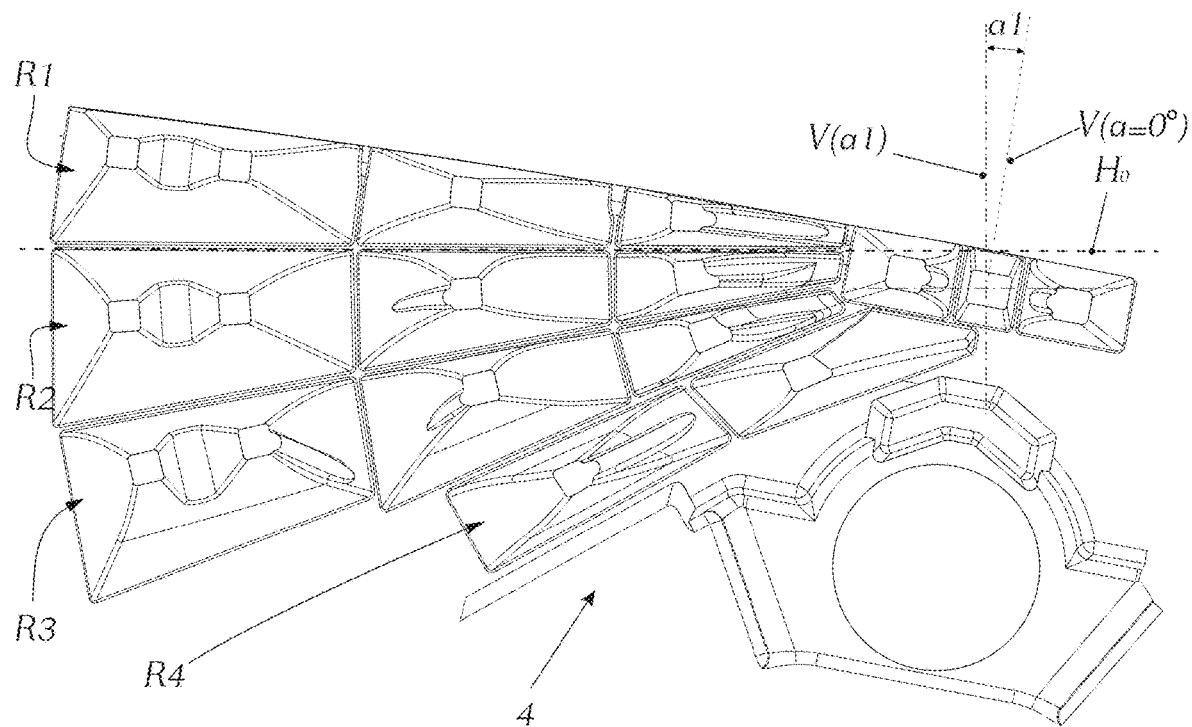

FIG. 6b shows a scenario wherein the illumination device 1 according to the present invention is tilted due to cornering. In the example shown in FIG. 6b a motorcycle comprising said illumination device 1 is tilted to the right side by an angle a1 (corresponding with a certain bank angle of the motorcycle). The vertical line V(a1) for this angle a1 is tilted when compared to the vertical line V(a=0°) that is based on an angle a=0°. As a consequence, the low beam distribution irradiated by a low beam light module 6 will be tilted correspondingly. Consequently, the right half of the light distribution irradiated by the low beam light module 6 will not reach up to the road horizon with the cut-off line of a low beam light distribution anymore, on the contrary said cut-off line ends below the road horizon. Hence, the illumination of a road would be reduced during cornering leading to potentially dangerous situations for the motorcyclist or traffic participants. In order to eliminate this risk, the illumination device 1 can be used to illumination the area that cannot be illuminated by the low beam light module 6 when cornering. It is worth noting that the upper row R1 can be split in two halves, a right and a left half, wherein depending on the inclination (i.e. bank angle) of the motorcycle either the right or the left half will be activated to compensate for the tilt of the low beam module 6. Due to optical imaging effects of the projection lens 5 the left half of the first row R1 will be projected to the right half of the light distribution on the road. Same applies to the rows R2, R3 and R4. Consequently, the right half of the first row R1 and the rows R5, R6 and R7 will be projected on the left half of the light distribution irradiated by the illumination device 1. The upper row R1 can be configured to follow the cut-off line and irradiate light upwards for said cut-off line (referred to as HDG-a1 to HDG-a4 in FIGS. 8a to 8d; Ho refers to a horizontal line in the upright position a=0°) when the motorcycle is in a upright position. The distribution of the following rows R2 and R5 is elevated upwards followed by the next rows R3 and R6 etc. As a result, depending on the extent of the inclination of the motorcycle (right or left) only the left/right half of the first row R1 or additional rows R2, R3, R4 or R5, R6, R7 will be activated. FIGS. 8a to 8d show different angles a1 to a4 and corresponding light distributions that can be irradiated by a illumination 1 device in order to support the low beam light module 6 and to complete the low beam distribution despite cornering of the motorcycle. In FIG. 8a, the left half of a first row R1 is activated and in FIG. 8b a second row R2 is activated in addition to the left half of the first row R1. FIG. 8c shows an additional activation of a third row R3 and FIG. 8d shows an additional activation of a fourth row R4. FIGS. 8a to 8d also clearly shows slight inhomogeneities between inner and outer segments of the light distribution that correspond to the columns C which occur when no protrusions P are used. These inhomogeneities can be fully compensated by implementation of the protrusions P as described in the present invention.

Figure 3:
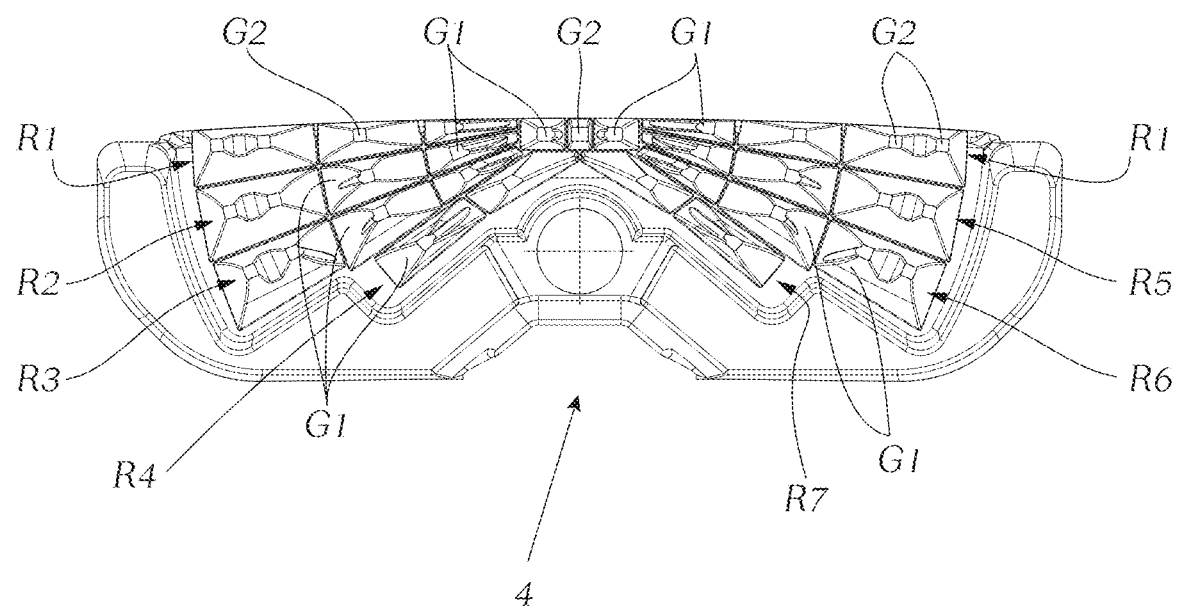

As can be seen from FIG. 3 and FIG. 5, at least some of the light guide elements 4a can be part of a second group G2 of light guide elements 4a, said second group G2 of light guide elements having a defined geometric shape of the light entry surface 4a', said light entry surface being limited by four corners G2a, G2b, G2c, G2d connected by four side edges, namely a left edge G2ad, a right edge G2bc, a lower edge G2ab and an upper edge G2dc, wherein all four side edges are straight. The light entry surface 4a' of each light guide element 4a of the second group G2 has essentially a quadratic shape. The number of light guide elements 4a of the first group G1 can amount to at least 33% of the total number of light guide elements 4a of the segmented light guide unit 4.

Preferably, the projection lens 5 has an optical axis and a Petzval area, wherein the segmented light guide unit 4 and the projection lens are arranged to each other in such a way that the collective light exit surface 4b' of the segmented light guide unit 4 is positioned in the Petzval area of the projection lens 5. Preferably, the segmented light guide unit 4 and the projection lens 5 are coaxially arranged with the main beam direction x of the illumination device 1.

Of course, the invention is not limited to the examples given in this specification, in particular the invention is not delimited to the precise values used in the exemplary calculations and equations, which merely show one embodiment of the invention that can be carried out by a person skilled in the art. The reference signs are only for informational purpose and do not delimit the scope of protection.

The invention claimed is:

1. An illumination device (1) for a motorcycle headlamp (2), wherein the illumination device (1) is configured to create a segmented light pattern, wherein the illumination device (1) comprises:
   a plurality of light sources (3), wherein at least some of these light sources (3) are configured to be activated independently from each other;
   a segmented light guide unit (4), comprising (i) a plurality of light guide elements (4a) and (ii) a light homogenization body (4b);
   wherein each light guide element (4a) has a distal end comprising a light entry surface (4a') that is configured to receive light (L) from at least one of the plurality of light sources (3), and wherein each light guide element (4a) fully extends towards the homogenization body (4b), said extension following at least partially along a main beam direction (x) of the illumination device (1), wherein the light guide elements (4a) are arranged in at least four columns (C) but no more than twelve columns (C) and least three rows (R1 to R7) in order to enable a segmentation of the light pattern, wherein the cross section of each light guide element (4a) continuously increases along its extension starting from its entry surface (4a') towards the light homogenization body (4b), said cross section being measured in a plane that is oriented orthogonal to the main beam direction (x), wherein the segmented light guide unit (4) is created as a single pieced component by way of molding, of the plurality of light guide elements (4a) together with the light homogenization body (4b), wherein the light homogenization body (4b) extends along the main beam direction (x) in order to allow at least partial homogenization of light received from the light guide elements (4a) and wherein the light homogenization body (4b) comprises a collective light exit surface (4b') for irradiating light (L1, L2, L3, L4) received by the light guide elements (4a); and
   a projection lens (5), which is configured to receive the light emitted from the collective light exit surface (4b') of the light homogenization body (4b) and to project the segmented light pattern,
   wherein at least some of the light guide elements (4a) are part of a first group (G1) of light guide elements (4a), said first group (G1) of light guide elements (4a) having a defined geometric shape of the light entry surface (4a'), said light entry surface being limited by four corners (G1a, G1b, G1c, G1d) connected by four side edges, namely a left edge (G1ad), a right edge (G1bc), a lower edge (G1ab) and an upper edge (G1dc), wherein three out of these four side edges are straight, and wherein the fourth edge differs from the three straight edges by having a rounded protrusion (P), said rounded protrusion (P) increasing the light entrance surface (4a'), wherein said fourth edge is either the left or the right edge of the respective light guide element (4a1).

2. The illumination device (1) according to claim 1, wherein the rounded protrusion (P) extends along between 30% and 80% of the length (GL) of the fourth edge.

3. The illumination device (1) according to claim 1, wherein the protrusion (P) increases the size of the light entrance surface (4a') between 5% and 30%.

4. The illumination device (1) according to claim 1, wherein the extent of the protrusion (P) continuously decreases along the extension of the respective light guide element (4a) towards the light homogenization body (4b).

5. The illumination device (1) according to claim 1, wherein the protrusion (P) ends prior to reaching the light homogenization body (4b).

6. The illumination device (1) according to claim 1, wherein the each light guide element (4a) of the segmented light guide unit (4) is assigned to a specific segment of the light pattern that can be irradiated by the illumination device (1), wherein neighbouring light guide elements (4a) are assigned to neighbouring segments (S3-1, S-4-1).

7. The illumination device (1) according to claim 6, wherein each row (R1 to R7) of the light guide element (4a) of the segmented light guide unit (4) including the light sources (3) assigned to these rows (R1 to R7) is configured to be activated and deactivated independently of each other, wherein the illumination device (1) is configured to be controlled based on an external signal corresponding to measured bank angle of the motorcycle, wherein the rows are arranged along lines, said lines being tilted with regard to another and activation and deactivation of the rows (R1 to R7) is performed based on the measured bank angle of the motorcycle, in order to add additional light irradiation into an area of a low beam distribution.

8. The illumination device (1) according to claim 1, wherein the illumination device (1) is configured to enable the irradiation of a high beam light distribution.

9. The illumination device (1) according to claim 1, wherein at least some of the light guide elements (4a) are part of a second group (G2) of light guide elements (4a), said second group (G2) of light guide elements having a defined geometric shape of the light entry surface (4a'), said light entry surface being limited by four corners (G2a, G2b, G2c, G2d) connected by four side edges, namely a left edge (G2ad), a right edge (G2bc), a lower edge (G2ab) and an upper edge (G2dc), wherein all four side edges are straight.

10. The illumination device (1) according to claim 9, wherein the light entry surface (4a') of each light guide element (4a) of the second group (G2) has essentially a quadratic shape.

11. The illumination device (1) according to claim 1, wherein the number of light guide elements (4a) of the first group (G1) amounts to at least 33% of the total number of light guide elements (4a) of the segmented light guide unit (4).

12. The illumination device (1) according to claim 1, wherein the projection lens (5) has an optical axis and a Petzval area, wherein the segmented light guide unit (4) and the projection lens are arranged to each other in such a way that the collective light exit surface (4b') of the segmented light guide unit (4) is positioned in the Petzval area of the projection lens (5).

13. The illumination device according to claim 1, wherein the segmented light guide unit (4) and the projection lens (5) are coaxially arranged with the main beam direction (x) of the illumination device (1).

14. A motorcycle headlamp (2) comprising:
 an illumination device (1) according to claim 1; and
 a low beam light module (6) for irradiating a low beam light distribution.

15. The motorcycle headlamp (2) according to claim 14, wherein the optic body (5) is developed into a single collective projection lens, said collective projection lens being configured to project light emitted from the illumination device (1) and the low beam light module (6).

16. The illumination device (1) according to claim 1, wherein the molding of the single pieced component comprises injection molding.

17. The illumination device (1) according to claim 7, wherein the lines that the rows are arranged along are straight lines.

* * * * *